United States Patent [19]
Legg

[11] Patent Number: 5,893,164
[45] Date of Patent: Apr. 6, 1999

[54] METHOD OF TRACKING INCOMPLETE WRITES IN A DISK ARRAY AND DISK STORAGE SYSTEM WHICH PERFORMS SUCH METHOD

[75] Inventor: Christopher B. Legg, Oceanside, Calif.

[73] Assignee: Unisys Corporation, Blue Bell, Pa.

[21] Appl. No.: 865,647

[22] Filed: May 30, 1997

[51] Int. Cl.[6] .................................................. G06F 12/16
[52] U.S. Cl. ........................................... 711/156; 711/112
[58] Field of Search ................................... 711/112, 113, 711/141, 161, 162, 156

[56] References Cited

U.S. PATENT DOCUMENTS 5,572,661  11/1996  Jacobson ............................. 395/182.05
5,708,668   1/1998  Styczinski ........................... 395/182.04

*Primary Examiner*—Eddie P. Chan
*Assistant Examiner*—Kevin L. Ellis
*Attorney, Agent, or Firm*—Charles J. Fassbender; Mark T. Starr; Steven R. Petersen

[57] ABSTRACT

A method of tracking incomplete writes in a disk array includes the steps of sequentially receiving a plurality of write commands which identify respective blocks in the array that are to be written; generating a list of expanded write areas for only those write commands which are received most recently, where each expanded write area encompasses the blocks that are to be written plus additional blocks which are likely to be written by subsequent write commands; modifying the list, each time a write command is subsequently received which writes a particular block that is not in any expanded write area in the list, by replacing one expanded write area with a new expanded write area that encompasses the particular block; and storing a replica of the list on a magnetic media each time the modifying step occurs.

14 Claims, 5 Drawing Sheets

METHOD OF TRACKING INCOMPLETE WRITES IN A DISK ARRAY AND DISK STORAGE SYSTEM WHICH PERFORMS SUCH METHOD

BACKGROUND OF THE INVENTION

This invention relates to methods of tracking incomplete writes in a disk array, and disk storage system which perform such methods.

In the prior art, the term "RAID" disk array has been defined to mean any Redundant Array of Inexpensive Disks; and several different RAID disk arrays have been defined. These include a Level One RAID disk array, a Level Three RAID disk array and a Level Five RAID disk array. See "A Case for Redundant Arrays of Inexpensive Disks (RAID)" by Patterson, et al., Report No. UCB/CSD 87/391, December 1987, Computer Science Division of the University of California at Berkeley.

With a Level Five RAID disk array, both parity and data are striped across a set of several disks. FIG. 1 shows one example of a Level Five RAID disk array in which the array resides on a set of five disks that are labeled Disk 0, Disk 1 ... Disk 4. Each column of the array contains data and parity which is stored in a single disk of the set. Each row of the array contains data and parity which are striped across all five disks of the set.

In FIG. 1, each row of the array consists of one parity chunk which resides on one disk, and four data chunks which reside on four other disks. Also, each data chunk and each parity chunk is partitioned into several physical blocks. A single block is the smallest portion of a chunk that can be separately addressed by a user program with a read or write command. In FIG. 1, there are eight blocks per chunk. Each block consists of a predetermined number of bytes (e.g.— 512 bytes) plus one cyclic redundant check byte called the "CRC" byte.

In the FIG. 1 array, block 0 in row 0 is addressed by a read/write command with a logical address of 0. As this logical address is sequentially incremented by one, the data blocks are addressed the following order: blocks 1–7 of data chunk 0, blocks 0–7 of data chunk 1, blocks 0–7 of data chunk 2, blocks 0–7 of data chunk 3, blocks 8–15 of data chunk 4, blocks 8–15 of data chunk 5, etc. For example, block 8 of data chunk 5 has a logical address of 40.

When a block of data is written, the CRC byte within that block is also generated and written. Further, the parity block which has the same block number as the data block is also generated and written. This parity block is written using odd parity or even parity.

With even parity, the exclusive-or of a parity block and all data blocks that have the same block number produces a block of all "0's". Conversely, with odd parity, the exclusive-or of a parity block and all data blocks that have the same block number produce a block of all "1's".

One way to generate the new parity block for a new data block that is to be written is as follows. First, the existing data block and its parity block are read from their respective disks. Then the new parity is calculated as the parity block which was read exclusive-or'd with the data block which was read exclusive-or'd with the new data block. This new parity block and the new data block are then written on their respective disks.

During the execution of a read command, the CRC byte is regenerated from the block of data that is read. If the regenerated CRC byte differs from the stored CRC byte, then the block of data which is read contains an error. To correct this error, the erroneous data block is regenerated by a) reading all of the other blocks (data and parity) on the disks which have the same block number as the erroneous data block; and b) exclusive-oring those blocks together.

Consider now the case where the execution of a particular write command is started which attempts to write data into a block having a particular block number "i", but that execution is interrupted before it is completed. Such an interruption can occur, for example, due to a power failure.

In the above case, the interruption can occur after the writing of the new data block is completed but before the writing of the new parity block has begun. Similarly, the interruption can occur after the writing of the new parity block has completed but before the writing of the new data block has begun. In either case, the exclusive-or of all blocks having block number "i" will not equal a block of all "0's" or all "1's". At the same time, the ECC byte for every block with block number "i" will be correct.

After the cause of the interruption is fixed, the array will continue to be read and written by the user programs. If any data block having block number "i" is read and the ECC byte detects an error, then an attempt will be made to regenerate the erroneous data block by exclusive-oring together the remaining data blocks and parity block with the same block number. But, due to the prior incomplete write, that regeneration process will not work.

This problem was addressed in the prior art by providing a flag in the disk array which was set to "1" when the array started to run, and reset to "0" when the array stopped running in a normal fashion. Thus, if the flag was found to be "1" before it was set when the array started to run, the normal operation of the array must have previously been interrupted.

However, a drawback with the above prior art flag is that after the flag is found to be in the incorrect state, it takes too long to identify the particular block that is incompletely written. To find the incompletely written block, every data block and every parity block in the entire array must be read; then parity blocks must be recalculated from the read data blocks; and then the recalculated parity blocks must be compared to the read parity blocks. For large arrays, this process can take over a day to complete.

Accordingly, a primary object of the present invention is to provide a method of tracking incomplete writes in a disk array and a disk storage system which performs such method, which eliminate the need to check parity for every block in the entire array after the normal operation of the array has been interrupted.

BRIEF SUMMARY OF THE INVENTION

With the present invention, incomplete writes in a disk array are tracked by a control program in a digital computer. This control program sequentially receives a plurality of write commands which identify respective blocks in the array that are to be written. In response, the control program generates a list of expanded write areas for only those write commands which are received most recently. Each such expanded write area encompasses the blocks that are to be written plus additional related blocks which are likely to be written by subsequent write commands. Also, the list is modified by the control program each time a write command is subsequently received which writes a particular block that is not in any expanded write area in the list. In this modification, one expanded write area in the list is replaced with a new expanded write area that encompasses the particular block. Further, each time the modifying step occurs, the control program stores a replica of the list on a magnetic media.

Due to an unexpected interrupt, such as a power failure, the write operation which is called for by any of the received write commands can be started but not completed. With the present invention, the presence of an incomplete write is detected by checking parity only on the blocks which are identified in the replica of the list. As a result, a substantial amount of time is saved in comparison to the time which it takes to check parity on all of the blocks in the entire disk array.

As a practical numerical example of the above savings, consider the case where the entire array stores nine hundred gigabytes, and the expanded write areas in the replica cover a total of five hundred megabytes. To check parity for a five hundred megabyte portion of the disk array will take about ten minutes. But nine hundred gigabytes is eighteen hundred times larger than five hundred megabytes, and thus to check parity for the entire array will take about (1800)×(ten minutes) or about thirty hours!

Increasing the total number of expanded write areas that are in the list, increases the probability that all of the blocks which are to be written by a write command will be encompassed by the list. That is a desirable result because it reduces the frequency with which the replica of the list needs to be updated on the magnetic media. Preferably, less than one percent of the write commands require a new expanded write area to be added to the list.

DETAILED DESCRIPTION

Figure 1:
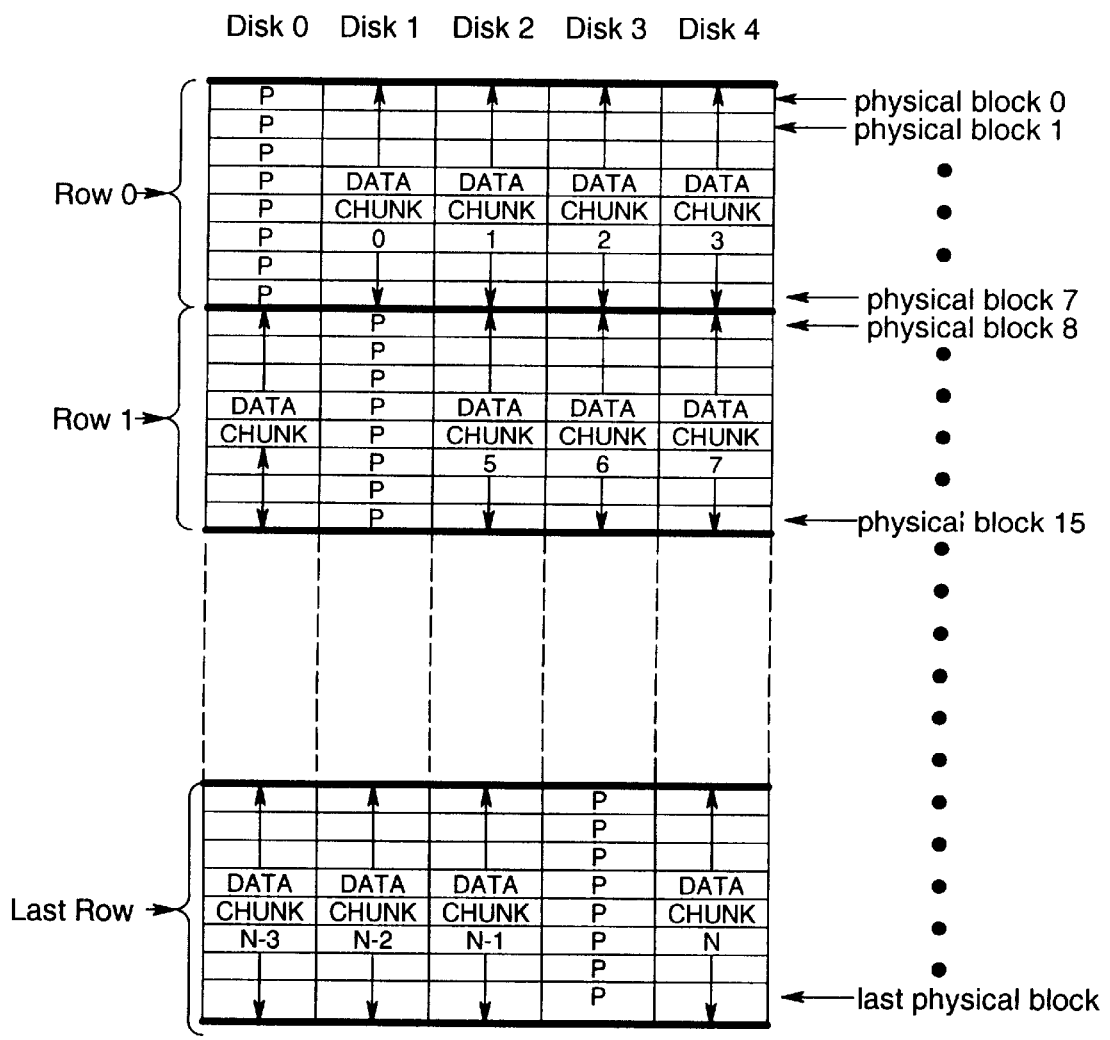
FIG. 1 shows the structure of a Level Five RAID disk array on which incomplete writes can occur.
Figure 2:
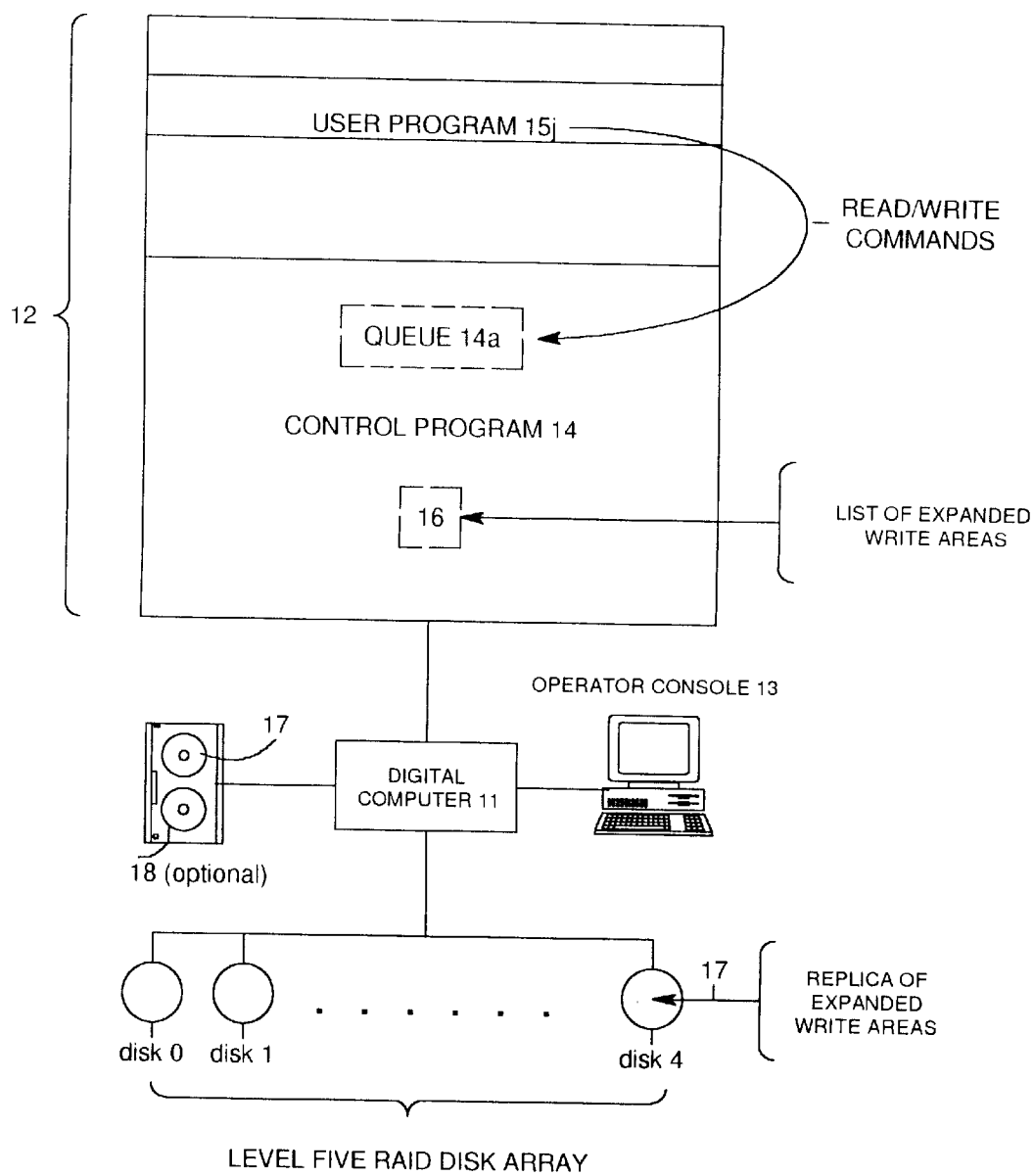
FIG. 2 shows one preferred embodiment of a disk storage system which tracks incomplete writes in the array of FIG. 1 in accordance with the present invention.

One preferred embodiment of a disk storage system which tracks incomplete writes in a disk array, in accordance with the present invention, is shown in FIG. 2. This FIG. 2 system includes a set of five disks (disk 0 through disk 4), and they store data blocks and parity blocks in a Level Five RAID disk array as described in the Background in conjunction with FIG. 1. Also, the FIG. 2 system includes a digital computer 11 which is coupled to the disk array, a semiconductor memory 12 which is coupled to the computer 11, and an operator counsel 13 which is coupled to the computer.

Stored within the memory 12 is a control program 14 and a plurality of user programs, one of which is shown as user program 15j. Each user program includes read/write commands which contain a logical address that identify particular data blocks within the disk array that are to be read or written. Those read/write commands are sequentially sent to a queue 14a in the control program 14 for execution.

Each write command in the queue 14a is subsequently received by the control program 14 and executed as follows.

First, the control program analysis the logical address in the write command to determine the number of each data block that is to be written, the number of the disk which contains that data block, and the number of the disk which contains the corresponding parity block. Then, the control program reads the present content of the above-identified data block and its corresponding parity block from their respective disks. Then, the control program calculates the new parity block as the parity block which was read, exclusive-or'd with the data block which was read, exclusive or'd with the new data block. Then the control program writes the new parity block and new data block on their respective disks.

Thus, the execution of each write command requires two read operations to be performed on two different disks followed by two write operations on the same two disks. These two write operations can be performed in any order; and consequently, if an unexpected interrupt such as a power failure occurs, the write operation on one disk can be completed before the write operation on the other disk begins.

Figure 3:
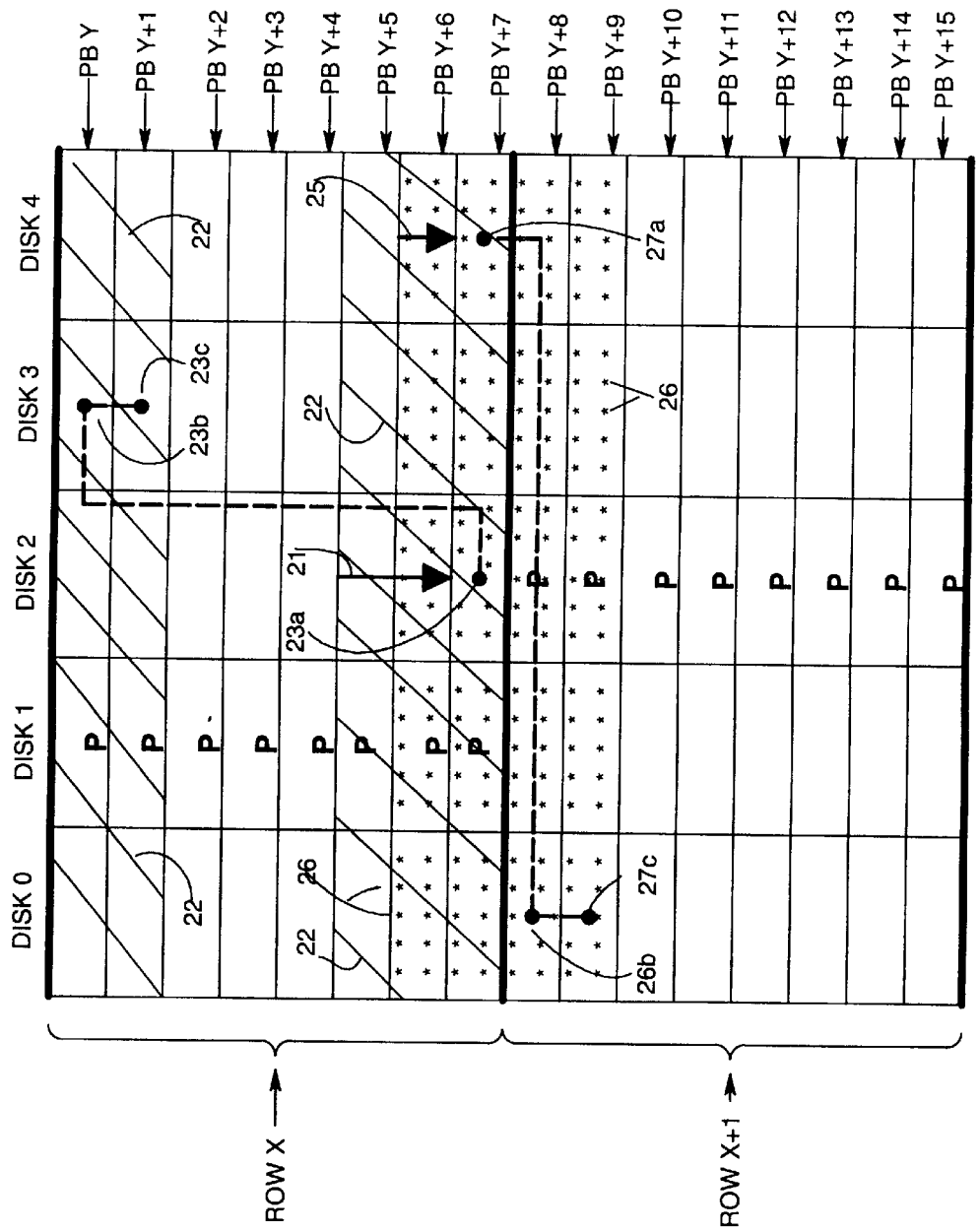
FIG. 3 shows the preferred structure of the expanded write areas which are used by the FIG. 2 disk storage system to track incomplete writes.

To track such incomplete write operations in the disk array, the FIG. 2 disk storage system further includes a list 16 in the semiconductor memory 12. This list 16 identifies expanded write areas for those write commands which the control program 14 received most recently from the queue 14a. Each expanded write area in the list encompasses the blocks that are to be written by the write command, plus additional related blocks. FIG. 3, which will be described shortly, shows two specific examples of these expanded write areas.

Each time a write command is received from the queue 14a for execution, the control program 14 compares the identity of the blocks that are to be written with the identity of the blocks that are in the expanded write areas in the list 16. If a block which is to be written is not in any expanded write area in the list 16, then the control program 14 replaces one expanded write area in the list 16 with a new expanded write area that encompasses the particular block that is to be written.

Preferably, all of the expanded write areas in the list 16 are arranged in that list in a least recently used fashion. Then, when a new expanded write area needs to be added to the list, the one expanded write area which gets replaced is the one which was used least recently. In any case, an expanded write area is not removed from the list 16 until all received write commands, which write a block in that expanded write area, are completely executed.

Also in the FIG. 2 disk storage system, a replica of the list 17 is stored on a magnetic media. In one embodiment, the replica 17 is stored on one of the five disks which hold the Level Five RAID disk array. Alternatively, the FIG. 2 disk storage system can include an auxiliary magnetic media 18 on which the replica 17 of the list is stored.

This replica 17 differs from the list 16 in that the expanded write areas which it identifies are arranged in no particular order. However, the list 16, and the replica 17 both identify the same expanded write areas.

One particular structure for the expanded write areas which are stored in the list 16 and its replica 17 is shown in FIG. 3. There, the large arrow 21 represents a write command which the control program 14 received from the queue 14a that calls for the writing of the two data blocks in which the arrow is drawn. Those data blocks are stored on disk 2 in physical block PBY+5 and PBY+6. For those two blocks, the expanded write area is illustrated in FIG. 3 by the hatch lines 22; and it encompasses the physical blocks PBY+5, PBY+6, PBY+7, PBY, and PBY+1 on all of the disks.

Similarly in FIG. 3, another large arrow 25 is drawn in one data block which is to be written in response to a second write command from the queue 14a. That data block is stored on disk 4 as physical block PBY+6. For that block, the expanded write area is illustrated in FIG. 3 by the dots 26; and this expanded write area encompasses the physical blocks PBY+6, PBY+7, PBY+8, and PBY+9 on all of the disks.

In FIG. 3, the extent of the expanded write area that is shown by the hatch lines 22 is determined as follows. First, the control program generates three extended logical addresses by adding one, two and three to the logical address of the block which is to be written last by the write command 21. Then the control program identifies the physical blocks which correspond to those extended logical addresses. Reference numerals 23a, 23b and 23c indicate the result of this step. Then the expanded write area is defined to consist of those physical blocks, plus the blocks that are to be written, on all of the disks.

Also, the expanded write area which is shown by the dots 26 is determined in the same fashion. In FIG. 3, reference numerals 27a, 27b, and 27c indicate the result of -a) adding one, two and three to the logical address of the block which is to be written by the write command 25, and b) identifying the corresponding physical blocks.

In the list 16, the expanded write area which is shown by the hatch lines 22 is identified in a compact form as (PBY+5,+2) and (PBY,+1). This compact form reduces the size of the list. With this form, the first item inside the parenthesis is a physical block on all of the disks in the expanded write area, and the second item is a count of the number of physical blocks which follow the above block on all of the disks. Similarly, the expanded write area which is shown by the dots 26 is represented in compact form as (PBY+6,+3).

Suppose now that the write command 25 is received from the queue 14a while the expanded write area that is shown by the hatch lines 22 is in the list 16. In that case, the expanded write area that is shown by the dots 26 will not be added to the list 16. This is because, as was explained above, the control program 14 compares the identity of the blocks that are to be written with the identity of the blocks that are in the expanded write areas in the list 16. If all of the blocks which are to be written by a particular write command are in the expanded write areas in the list 16, then a new expanded write area for that command is not added to the list.

Figure 4:
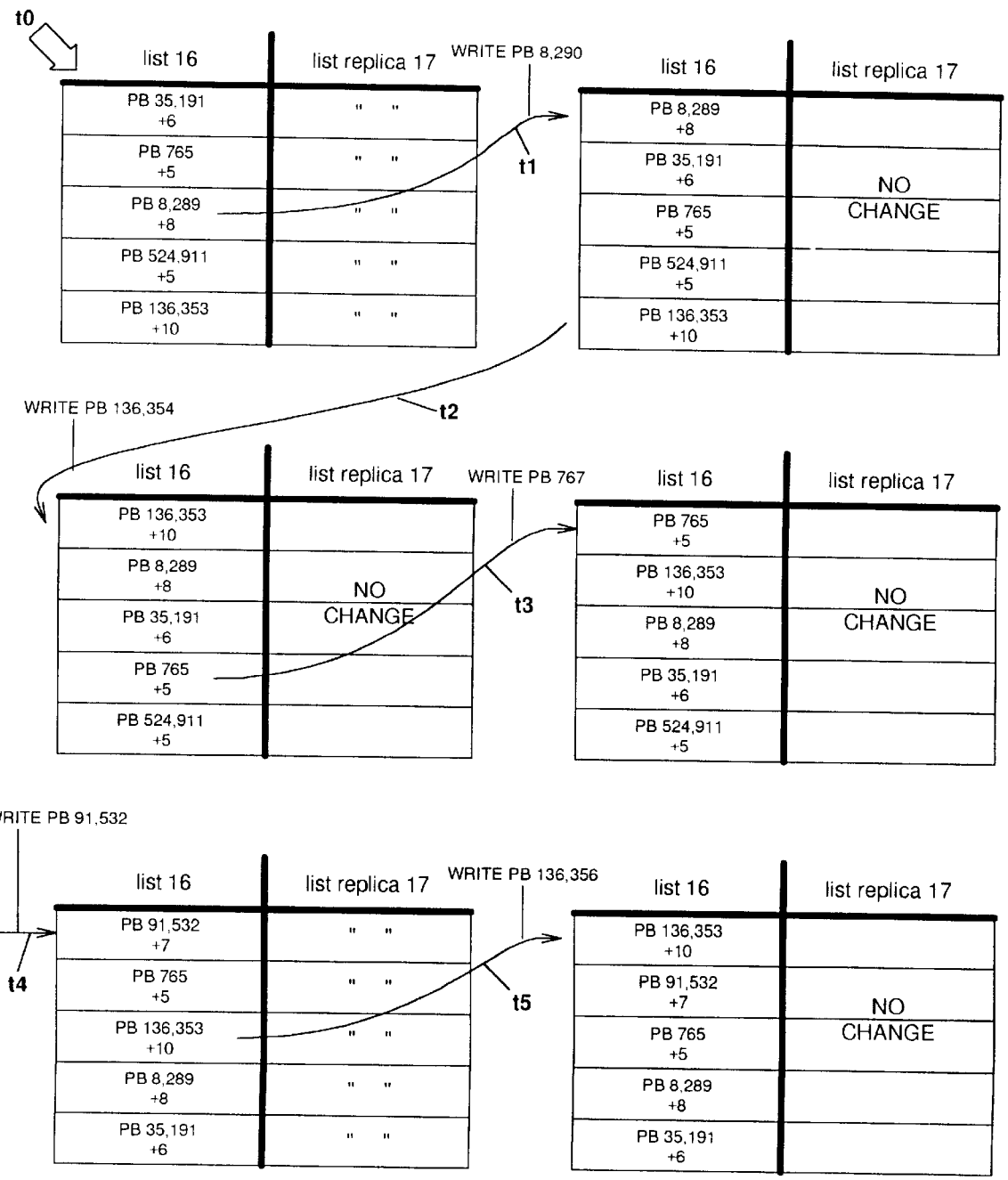
FIG. 4 shows how the expanded write areas of FIG. 3 are stored in a list, and a replica of that list, within the FIG. 2 disk storage system.

One specific example which illustrates the operation of the list 16 and its replica 17 is shown in FIG. 4. In this example, the initial content of the list 16 and its replica 17 occur at time t0. At that time, the most recently used expanded write area in the list 16 is (PB35,191+6); the next most recently used expanded write area is (PB765+6); . . . and the least recently used expanded write area is (PB136, 353+6).

Thereafter at time t1 in FIG. 4, a write command is received from the queue 14a by the control program 14 which calls for physical block PB8,290 to be written. This physical block is included in the expanded write area (PB8,289+8) which is in the list 16. Thus, no new expanded write area is added to the list; and so the list replica 17 remains unchanged. But, the expanded write areas in the list 16 are rearranged to maintain their order of use.

Next at time t2 in FIG. 4, a write command is received from the queue 14a by the control program 14 which calls for physical block PB136,354 to be written. This physical block is included in the expanded write area (PB136,353+10) which is in the list 16. Thus, no new expanded write area is added to the list; and so the list replica 17 remains unchanged. But again, the expanded write areas in the list 16 are rearranged to maintain their order of use.

Next at time t3 in FIG. 4, a write command is received from the queue 14a by the control program 14 which calls for physical block PB767 to be written. This physical block is included in the expanded write area (PB765+6) which is in the list 16. Thus, no new expanded write area is added to the list, and so the list replica 17 again remains unchanged. But again, the expanded write areas in the list 16 are rearranged again to maintain their order of use.

Next at time t4 in FIG. 4, a write command is received from the queue 14a by the control program 14 which calls for physical block PB91,532 to be written. This physical block is not included in any of the expanded write areas which are in the list 16. Thus a new expanded write area (PB91,532+3) is added to the list 16; the least recently used expanded write area (PB524,911+6) is deleted from the list 16; and all expanded write areas in the list are arranged in their order of use. Also the list replica 17 is written so that its content is the same as the new list 16.

Lastly, at time t5 in FIG. 4, a write command is received from the queue 14a by the control program 14 which calls for physical block PB136,356 to be written. This physical block is included in the expanded write area (PB136,353+10) which is in the list 16. Thus, no new expanded write area is added to the list, and so the list replica 17 remains unchanged. But again, the expanded write areas in the list 16 are rearranged to maintain their order of use.

Note that in order to simplify FIG. 4, a total of only five expanded write areas are shows in the list 16 (and its replica 17). However, that list is much larger in an actual disk storage system. Preferably, the expanded write areas that are in the list 16 cover a total storage area in the array of one-hundred megabytes to one gigabyte.

Increasing the total number of expanded write areas that are in the list 16, increases the probability that all of the blocks which are to be written by a write command from the queue 14a will be encompassed by the list. That is a desirable result because it reduces the frequency with which the replica 17 of the list needs to be updated on the magnetic media. Preferably, less than one percent of the write commands from the queue 14a require a new expanded write area to be added to the list 16. But, increasing the total number of expanded write areas that are in the list 16 also increases the number of blocks on which parity needs to be checked after an unexpected interrupt occurs.

Suppose for example that an unexpected interrupt occurs while the FIG. 2 system is performing a write command from the queue 14a. Due to that interruption, the writing of a data block on one disk can be completed before the writing of the corresponding parity block on another disk has begun, or vice-versa. Consequently, the array must be checked for the presence of such an incomplete write, after the cause of the interruption is fixed.

With the present invention, the presence of an incomplete write is detected by checking parity only on the blocks which are identified in the replica 17 of the list 16. As a result, a substantial amount of time is saved in comparison to the time which it takes to check parity on all of the blocks in the entire Level Five RAID disk array.

As a practical numerical example of the above savings, consider the case where the entire array stores nine hundred gigabytes, and the expanded write areas in the replica 17 cover a total of five hundred megabytes. To check parity for a five hundred megabyte portion of the disk array will take about ten minutes. But nine hundred gigabytes is eighteen hundred times larger than five hundred megabytes, and thus to check parity for the entire array will take about (1800)× (ten minutes) or about thirty hours!

One preferred method of tracking incomplete writes in a disk array, as well as one preferred disk storage system which performs such method, has now been described in detail. However, various modifications can be made to those details without departing from the scope of the invention.

For example, in FIG. 3, the extent of each expanded write area was determined by adding one, two and three to the logical address of the block which is written last by the write commands from the queue 14a. But as a modification, the number of integers which are added to that logical address can be increased. Such an increase will in turn increase the probability that the expanded write area will encompass all of the blocks which are to be written by subsequent write commands from the queue. Preferably, the numbers which are added to the logical address of the last written block range from one to two-hundred.

As another modification, the extent of each expanded write area can be determined by subtracting one, two, etc. from the logical address of the block which is written first by the write commands from the queue 14a. With this modification, the expanded write area will include blocks in the array which precede the blocks that are to be written. This will also increase the probability that the expanded write area encompasses all of the blocks which are to be written by future write commands from the queue. Preferably, the numbers which are subtracted from the logical address of the block which is written first range from one to two-hundred.

As another modification, each expanded write area in the list 16 can be defined to encompass only the blocks which are to be written by a write command, plus additional blocks which are identified by adding one, two, etc. to the logical address of the last block to be written and/or subtracting one, two etc. from the logical address of the first block to be written. An example of this modification is shown in FIG. 5.

Figure 5:
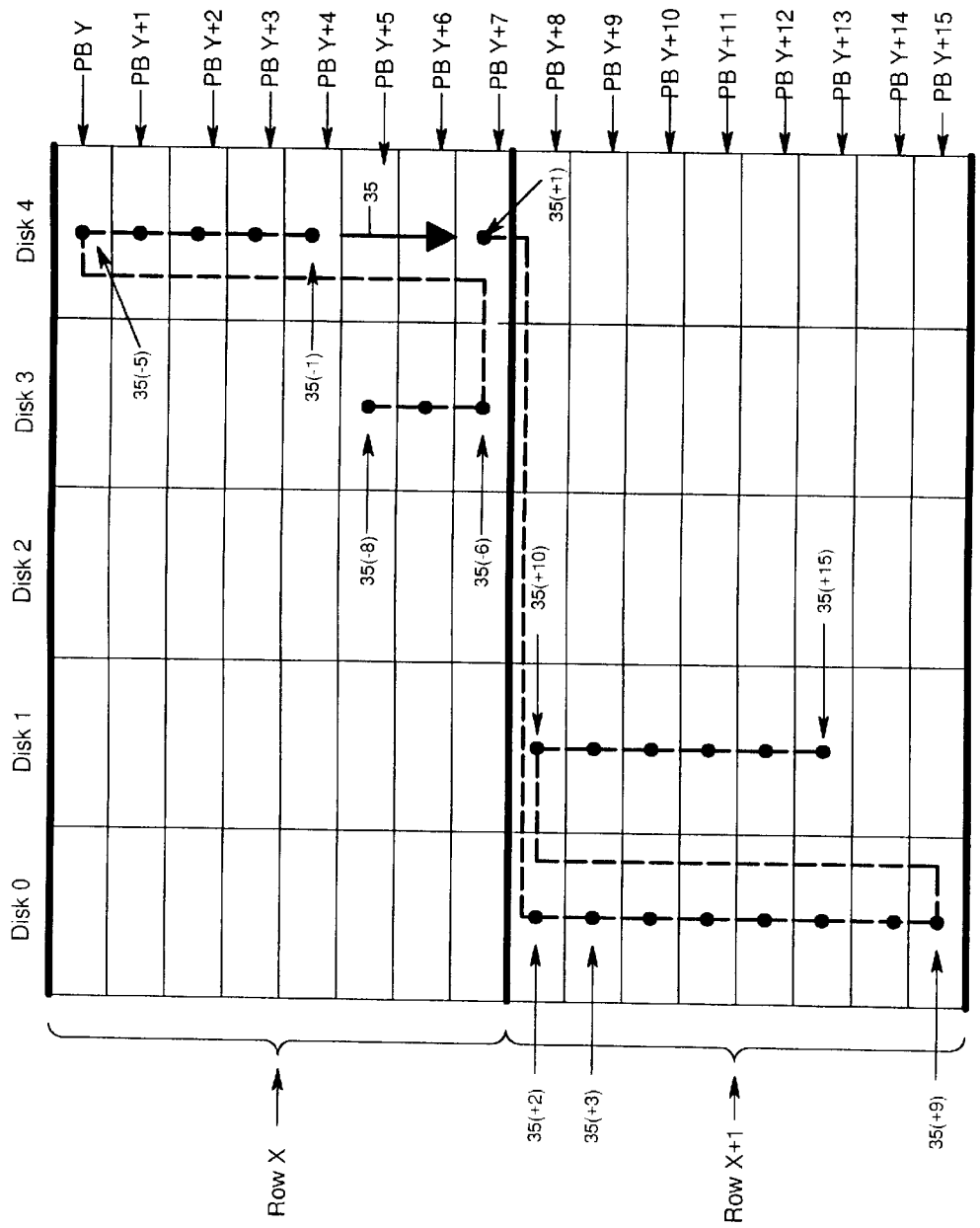
FIG. 5 shows a second preferred structure of the expanded write areas which are used by the FIG. 2 disk storage system to track incomplete writes.

In FIG. 5, an arrow 35 represents a write command from the queue 14a which calls for the writing of two blocks that have logical addresses $LA_W$ and $LA_W+1$. Those two blocks reside in disk 4 as physical blocks PB Y+5 and PB Y+6. For those two blocks, the expanded write area is defined in FIG. 5 to be the blocks which are to be written, plus additional blocks which are identified by adding one, two, . . . fifteen to the logical address of the last block to be written, plus additional blocks which are identified by subtracting one, two . . . eight from the logical address of the first block to be written. These additional blocks are indicated in FIG. 5 by reference numbers 35(+1) through 35(+15) and 35(-1) through 35(-8).

In the list 16 and its replica 17, the FIG. 5 expanded write area is identified in a compact form as ($LA_W-8$, $LA_W+16$). With this form, the first item inside the parenthesis is the logical address of the first block in the expanded write area, and the second item is the logical address of the last block in the expanded write area.

When the expanded write areas are defined as shown in FIG. 5, then the presence of an incomplete write is detected after an unexpected interrupt as follows. First, the control program 14 converts all of the logical addresses that are included within the expanded write areas in the replica 17 to a corresponding physical block. During this conversion, the particular disk on which each physical block resides is ignored. Then, those physical blocks are read from all of the disks in the array. Parity is regenerated from the data blocks that are read and compared to the parity blocks that are read.

As another modification, the expanded write area in FIG. 5 can be increased or decreased in size. Preferably, the numbers which are added to the logical address of the last block to be written and the numbers which are to be subtracted from the logical address of the first block to be written range from one to two-hundred.

Also, as another modification, the list 16 is not limited to one which arranges the expanded write area in a least recently used order. Instead, any predetermined algorithm can be used to remove one expanded write area from the list 16 to make room for a new expanded write area. As one example, the expanded write area which is removed from the list 16 can be the one which has been in the list the longest. As another example, the expanded write area which is removed from the list 16 can be selected randomly.

Further as still another modification, the list 16 need not be stored in the same semiconductor memory 12 which holds the control program 14 as shown in FIG. 2. Instead, the list 16 can be stored in a memory or a set of registers which are included within the computer 11.

Further, as another modification, the RAID disk array which holds the data blocks and parity blocks need not be a Level Five array. Instead, those data blocks and parity blocks can be arranged on the disks in any fashion which allow an erroneous data block to be regenerated from a parity block. For example, the array which holds the data blocks and parity blocks can be a Level Three RAID disk array as cited in the "Background".

Accordingly, it is to be understood that the scope of the present invention is not limited to the details of any one particular embodiment which has been described, but instead is defined by the appended claims.

What is claimed is:

1. A computer implemented method, performed by a computer program, of tracking incomplete writes in a disk array; said method including the steps of:

sequentially receiving a plurality of write commands which identify respective blocks in said array that are to be written;

generating a list of expanded write areas for only those write commands which are received most recently, where each expanded write area encompasses the blocks that are to be written plus additional blocks which are related thereto;

modifying said list, each time a write command is subsequently received which writes a particular block that is not in any expanded write area in said list, by replacing one expanded write area with a new expanded write area that encompasses said particular block; and, storing a replica of said list on a magnetic media each time said modifying step occurs.

2. A method according to claim 1 wherein the expanded areas in said list cover a total storage area in said array of one-hundred megabytes to one gigabyte.

3. A method according to claim 1 wherein each expanded write area encompasses between one and four-hundred additional blocks.

4. A method according to claim 1 wherein each expanded write area encompasses the same physical blocks on all of said disks.

5. A method according to claim 1 wherein each expanded write area encompasses selected physical blocks on selected disks.

6. A method according to claim 1 wherein said modifying step replaces the expanded write area in said list which was written least recently.

7. A method according to claim 1 wherein said program generates said list in a volatile semiconductor memory.

8. A method according to claim 1 wherein said program generates said list in a volatile set of registers.

9. A method according to claim 1 wherein said magnetic media on which said replica of said list is stored is a disk in said array.

10. A method according to claim 1 wherein said magnetic media on which said replica of said list is stored in an auxiliary media which is external to said disk array.

11. A method according to claim 1 wherein said array is a Level Five RAID disk array.

12. A method according to claim 1 and further including the steps of -a) starting to write a particular block in said array which is identified by a received write command, and b) interrupting the writing of said particular block before it is completely written.

13. A method according to claim 1 and further including the steps of -a) reading said replica from said magnetic media after the writing of a particular block in said array has been interrupted, and b) checking parity, only on blocks which are encompassed by the expanded write areas in said replica.

14. A computer storage system, which is comprised of an array of disks which are coupled to a digital computer; a control program in said computer, which sequentially receives a plurality of write commands from other computer programs that identify respective blocks in said array that are to be written; a list in said computer of expanded write areas for only those write commands which are received most recently, where each expanded write area encompasses the blocks that are to be written plus additional blocks which are related thereto; wherein said control program modifies said list, each time a write command is subsequently received which writes a particular block that is not in any expanded write area in said list, by replacing one expanded write area with a new expanded write area that encompasses said particular block; and, a magnetic media which stores a replica of said list each time said list is modified by said control program.

\* \* \* \* \*